United States Patent
Zhang et al.

(10) Patent No.: US 10,164,729 B2
(45) Date of Patent: Dec. 25, 2018

(54) SYSTEM AND METHOD OF TONE MAPPING DURING SINGLE USER AND MULTIPLE USER OPERATING MODES INCLUDING TRANSMISSIONS RESPECTIVELY OF OFDM SYMBOLS AND OFDMA SYMBOLS IN A WLAN

(71) Applicant: Marvell World Trade Ltd., St. Michael (BB)

(72) Inventors: Hongyuan Zhang, Fremont, CA (US); Mingguang Xu, San Jose, CA (US); Yakun Sun, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 539 days.

(21) Appl. No.: 14/823,257

(22) Filed: Aug. 11, 2015

(65) Prior Publication Data
US 2016/0099789 A1 Apr. 7, 2016

Related U.S. Application Data

(60) Provisional application No. 62/058,887, filed on Oct. 2, 2014.

(51) Int. Cl.
*H04J 11/00* (2006.01)
*H04L 5/00* (2006.01)
(Continued)

(52) U.S. Cl.
CPC .......... *H04J 11/003* (2013.01); *H04L 5/0007* (2013.01); *H04L 5/0048* (2013.01);
(Continued)

(58) Field of Classification Search
None
See application file for complete search history.

(56) References Cited

U.S. PATENT DOCUMENTS

| | | | |
|---|---|---|---|
| 2011/0038249 A1* | 2/2011 | Tamaki | H04L 27/2655 370/210 |
| 2011/0207418 A1* | 8/2011 | Laroia | H03D 3/008 455/75 |

(Continued)

FOREIGN PATENT DOCUMENTS

WO  WO-2012051319 A1  4/2012

OTHER PUBLICATIONS

International Search Report and Written Opinion for PCT Application No. PCT/US2015/048117 dated Nov. 16, 2015; 9 pages.
(Continued)

*Primary Examiner* — Ayaz R Sheikh
*Assistant Examiner* — Mariela Vidal Carpio

(57) ABSTRACT

A system including a direct current tone, guard tone, data tone allocation, mapping, and inverse Fourier transform (IFT) modules. The direct current tone module determines a number of direct current tones based on whether a network device is operating in a single user or multi-user mode. The guard tone module determines a number of guard tones based on whether the network device is operating in the single user or multi-user mode. The data tone allocation module determines a number of data tones based on the number of direct current and guard tones. The mapping module receives data and based on the number of data tones, maps the data to the data tones. The IFT module performs a frequency to time domain conversion of an output of the mapping module to generate orthogonal frequency division multiplexing (OFDM) symbols during the single user mode and OFDM access symbols during the multi-user mode.

24 Claims, 7 Drawing Sheets

(51) Int. Cl.
*H04L 27/26* (2006.01)
*H04W 72/04* (2009.01)
*H04W 88/06* (2009.01)

(52) U.S. Cl.
CPC .......... *H04L 5/0073* (2013.01); *H04L 27/261* (2013.01); *H04W 72/048* (2013.01); *H04L 5/0044* (2013.01); *H04W 88/06* (2013.01)

(56) References Cited

U.S. PATENT DOCUMENTS

| | | | | |
|---|---|---|---|---|
| 2015/0010098 | A1* | 1/2015 | Kenney | H04L 1/00 375/267 |
| 2015/0117309 | A1* | 4/2015 | Gage | H04W 8/005 370/328 |
| 2015/0118980 | A1* | 4/2015 | Leung | H04B 1/38 455/114.2 |
| 2015/0229502 | A1* | 8/2015 | Vilaipornsawai | H04L 27/2607 375/295 |
| 2015/0381330 | A1* | 12/2015 | Chen | H04L 5/0046 370/329 |
| 2016/0044675 | A1* | 2/2016 | Chen | H03M 13/1102 370/329 |
| 2016/0050666 | A1* | 2/2016 | Yang | H04W 72/02 370/329 |
| 2016/0050672 | A1* | 2/2016 | Chen | H04W 72/06 370/329 |
| 2016/0080043 | A1* | 3/2016 | Tian | H04B 7/022 375/267 |
| 2016/0218844 | A1* | 7/2016 | Suh | H04L 5/0007 |
| 2016/0219312 | A1* | 7/2016 | Mun | H04N 21/2383 |
| 2017/0195030 | A1* | 7/2017 | Yoshimura | H04B 7/0626 |

OTHER PUBLICATIONS

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.
IEEE Std 802.20-2008; IEEE Standard for Local and metropolitan area networks; Part 20: Air Interface for Mobile Broadband Wireless Access Systems Supporting Vehicular Mobility-Physical and Media Access Control Layer Specification; IEEE Computer Society; Sponsored by the LAN/MAN Standards Committee; Aug. 29, 2008; 1032 pages.
IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.
IEEE P802.11ad / D5.0 (Draft Amendment based on IEEE P802. 11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.
IEEE P802.11ah / D1.0 (Amendment to IEEE Std 802.11 REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.
IEEE P802.11ax; Selection Procedure Draft Standard IEEE 802.11-014/0938-03-00ax, Jul. 2014; IEEE 082.11-14/0980r6 IEEE P802. 11 Wireless LANs, Jul. 2014; 11ax Evaluation Methodology, Jan. 15, 2015; IEEE 802.11ax Channel Model Document IEEE 802.11-14/0882r4, Sep. 16, 2014; Proposed 802.11ax Functional Requirements, May 2014; Specification Framework for TGax IEEE 802. 11-15/0132r2, Jan. 2015; Total Pages 117.
IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.
IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.
Kiran Gunnam et al.; "Multi-Rate Layered Decoder Architecture for Block LDPC Codes of the IEEE 802.11n Wireless Standard"; 2007; pp. 1645-1648.

* cited by examiner

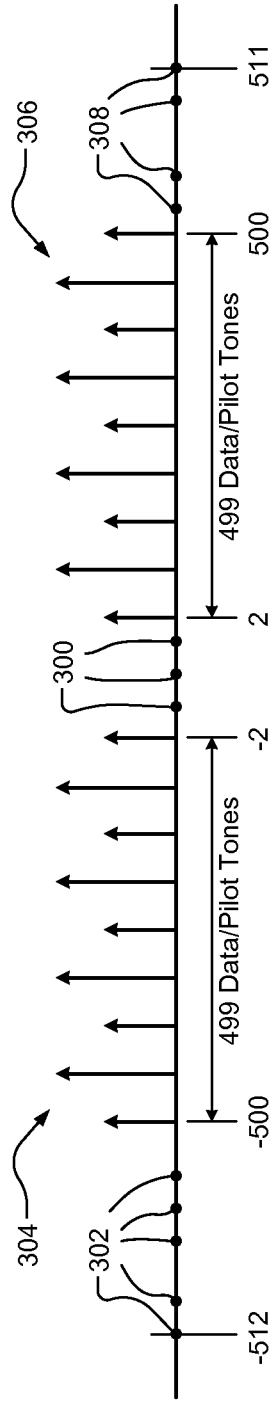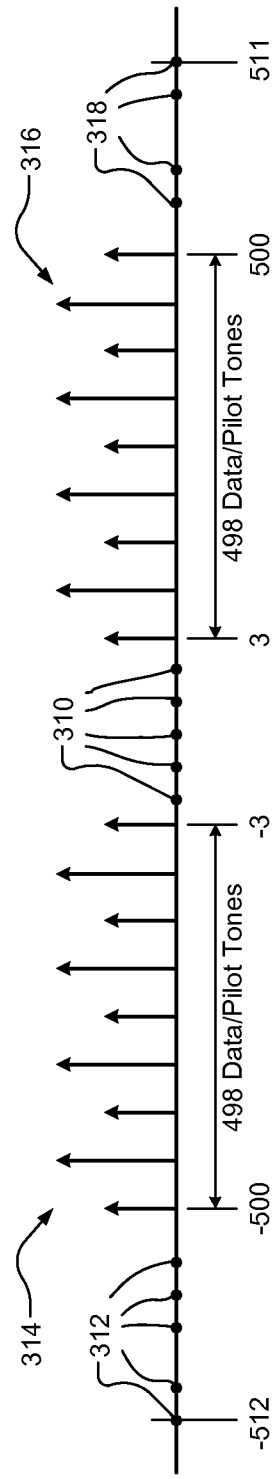

US 10,164,729 B2

SYSTEM AND METHOD OF TONE MAPPING DURING SINGLE USER AND MULTIPLE USER OPERATING MODES INCLUDING TRANSMISSIONS RESPECTIVELY OF OFDM SYMBOLS AND OFDMA SYMBOLS IN A WLAN

CROSS-REFERENCE TO RELATED APPLICATIONS

The present disclosure claims the benefit of U.S. Provisional Application No. 62/058,887, filed on Oct. 2, 2014. The entire disclosure of the application referenced above is incorporated herein by reference.

FIELD

The present disclosure relates to wireless local area networks (WLANs), and more particularly to tone mapping for orthogonal frequency division multiplexing (OFDM) and orthogonal frequency division multiplexing access (OFDMA) symbols in a WLAN.

BACKGROUND

OFDM is employed in wireless communication systems for transmission of data between network devices in wireless local area networks. Various Institute of Electrical and Electronics Engineers (IEEE) 802.11 wireless networking standards (IEEE 802.11ac, IEEE 802.11b, IEEE 802.11g, IEEE 802.11n, etc.) are marketed under the brand name Wi-Fi® and are directed to high-throughput wireless local area networks (WLANs). Wi-Fi® is a local area wireless computer networking technology that allows electronic devices to communicate, mainly using the 2.4 giga-hertz (GHz) ultra-high frequency (UHF) and 5 GHz super high frequency (SHF) industrial, scientific and medical (ISM) radio bands.

In a Wi-Fi® network, a first network device may transmit data in a predetermined band to a second network device using OFDM. The predetermined band may have a predetermined number of tones (sometimes referred to as sub-carriers) on which the data may be sent. The first network device may transmit the data using all of the sub-carriers in the predetermined band except for a direct current (DC) tone and a predetermined number of guard tones. The DC tone refers to a zero frequency (or center frequency) tone of the predetermined band. The guard tones refer to tones at edges of and within the predetermined band. Data is not transmitted at the guard tones to prevent interference with signals transmitted by other network devices in bands adjacent to the predetermined band.

SUMMARY

A system is provided and includes a direct current tone module, a guard tone module, a data tone allocation module, a mapping module, an inverse Fourier transform module, and a transmitter. The direct current tone module is configured to determine a number of direct current tones based on whether a first network device is operating in a single user mode or a multi-user mode. The guard tone module is configured to determine a number of guard tones based on whether the first network device is operating in the single user mode or the multi-user mode. The data tone allocation module is configured to determine a number of data tones based on (i) the number of direct current tones and (ii) the number of guard tones. The mapping module is configured to (i) receive data, and (ii) based on the number of data tones, map the data to the data tones. The inverse Fourier transform module is configured to perform a frequency domain to time domain conversion of an output of the mapping module to generate (i) orthogonal frequency division multiplexing symbols responsive to the first network device operating in the single user mode, and (ii) orthogonal frequency division multiplexing access symbols responsive to the first network device operating in the multi-user mode. The transmitter is configured to transmit via a channel of a wireless local area network and from the first network device (i) the orthogonal frequency division multiplexing symbols responsive to the first network device operating in the single user mode, and (ii) the orthogonal frequency division multiplexing access symbols responsive to the first network device operating in the multi-user mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 5 is a tone diagram illustrating DC tones, data tones and guard tones for a single user operating mode in accordance with an embodiment of the present disclosure.

FIG. 6 is a tone diagram illustrating DC tones, data tones and guard tones for another single user operating mode in accordance with an embodiment of the present disclosure.

In the drawings, reference numbers may be reused to identify similar and/or identical elements.

DESCRIPTION

As disclosed herein, network devices operating according to IEEE 802.11/Wi-Fi® standards (e.g., IEEE 802.11ax) may operate in multiple modes. The multiple modes may include a single user mode and a multi-user mode. A first network device may communicate with a single network device during the single user mode. The first network device may communicate with multiple network devices during the multi-user mode. The first network device may be an access point or base station. In one implementation, the first network device is not an access point or a base station.

Figure 1:
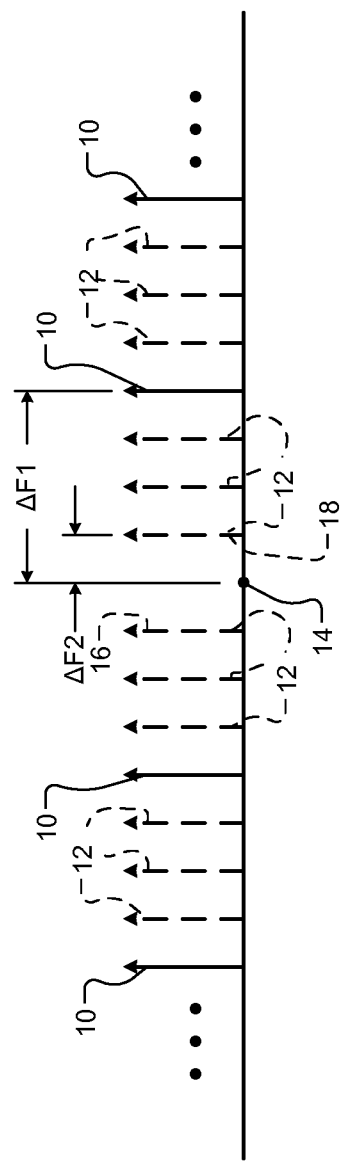
FIG. 1 is a tone diagram illustrating reduced tone spacing that may be implemented for OFDM and/or OFDMA transmissions in accordance with an embodiment of the present disclosure.

During the single user (or first operating) mode and/or the multi-user (or second operating) mode, the first network device may transmit data via tones having a reduced spacing of tones relative to the spacing of tones used according to, for example, IEEE 802.11ac or IEEE 802.11g. For example, the reduced tone spacing may be $\frac{1}{4}^{th}$ the tone spacing used according to IEEE 802.11ac or IEEE 802.11g. FIG. 1 shows a tone diagram illustrating a reduced tone spacing. In FIG. 1, tones used according to, for example, IEEE 802.11ac are shown and designated 10 for a designated bandwidth. For the same bandwidth, tones having the reduced tone spacing include tones 10 and tones designated 12. The tones 10 have a tone spacing (or frequency range between tones) designated $\Delta F1$. The collective tones 10, 12 have a tone spacing designated $\Delta F2$.

Reduced tone spacing can negatively affect distortion of certain data tones due to residual (RX) DC offset at a receiver of a receiving network device. A receiver can experience DC offset and carrier frequency offset (CFO) relative to a transmitter of a transmitting network device. The DC offset refers to a difference in frequency between a DC (or center frequency) tone of the receiver and a DC (or center frequency) tone of the transmitter. The CFO refers to a difference in frequency between a carrier frequency of the receiver and a corresponding carrier frequency of the transmitter. During processing of received signals, the receiver may estimate and compensate for the DC offset and the CFO. The ability to fully compensate for the DC offset and the CFO affects a residual DC offset resulting after post processing of the received signals.

Depending on the size of the CFO and/or residual DC offset, data tones adjacent or near in frequency to a DC tone (e.g., center DC tone 14) may be shifted at the receiver and end up overlapping the frequency of the DC tone due to the reduced tone spacing. This overlapping can cause distortion of the data tones that are adjacent or near in frequency to the DC tone. As a result, data received on the data tones, which are adjacent or near in frequency to a DC tone, may be erased or ignored at the receiver to improve performance in outputting data that accurately matches originally transmitted data. Additional DC tones (or tones between a center DC tone and the nearest data tones) may be used. The additional DC tones may have frequencies below and above a center frequency of a center DC tone. For example, FIG. 1 shows the center DC tone 14 having a corresponding center frequency. The data tones 16, 18 adjacent to the center DC tone 14 may not be used for transmitting data and may be used as DC tones (or tones for which data is not being transmitted). This increases the spacing between the data tones adjacent to the DC tones and provides additional DC tones for which data may be erased or ignored.

During the single user mode, uplink transmissions and downlink transmissions sent between the first network device and the second network device may include OFDM signals. During the multi-user mode, the uplink transmissions and downlink transmissions sent between the first network device and the multiple network devices may include OFDMA signals. The first network device may allocate a corresponding one or more data tones (collectively referred to as a tone block) for each of the multiple network devices. One or more tone blocks may be allocated to each of the multiple network devices. As a result, the number of data tones used per network device during the multi-user mode is typically much smaller than the number of data tones used for the second network device during the single user mode. During the signal user mode and the multi-user mode, the tones that are not used as DC tones and guard tones may be used as data tones. Since there is a reduced number of data tones (small tone blocks) per user that are used during the multi-user mode, any distortion due to residual RX DC offset and/or adjacent band interference substantially increases the percentage of unusable data tones. This can negatively affect the performance of a receiver in being able to correctly determine data that was originally transmitted by a transmitter.

Although increasing the number of DC tones for which data may be erased or ignored improves receiver performance, increasing the number of DC tones decreases spectral efficiency. Also, although increasing the number of guard tone decreases interference between transmission bands, increasing the number of guard tones decreases spectral efficiency. To improve spectral efficiency the number of data tones for which data is used at the receiver is increased. Increasing the number of data tones decreases the number of DC tones and/or guard tones, which improves spectral efficiency. Thus, there can be a tradeoff between receiver performance and spectral efficiency.

Tone mapping plans are disclosed below to (i) accommodate the reduced tone spacing for the single user and multi-user modes, and (ii) include the uplink and downlink of OFDMA signals during the multi-user mode. A tone mapping plan refers to the number of tones within a given frequency band that are designated as DC tones, guard tones and data tones. A tone mapping plan may also indicate: the number of tones allocated to each network device; frequencies of the tones; and/or tone spacing.

Figure 2:
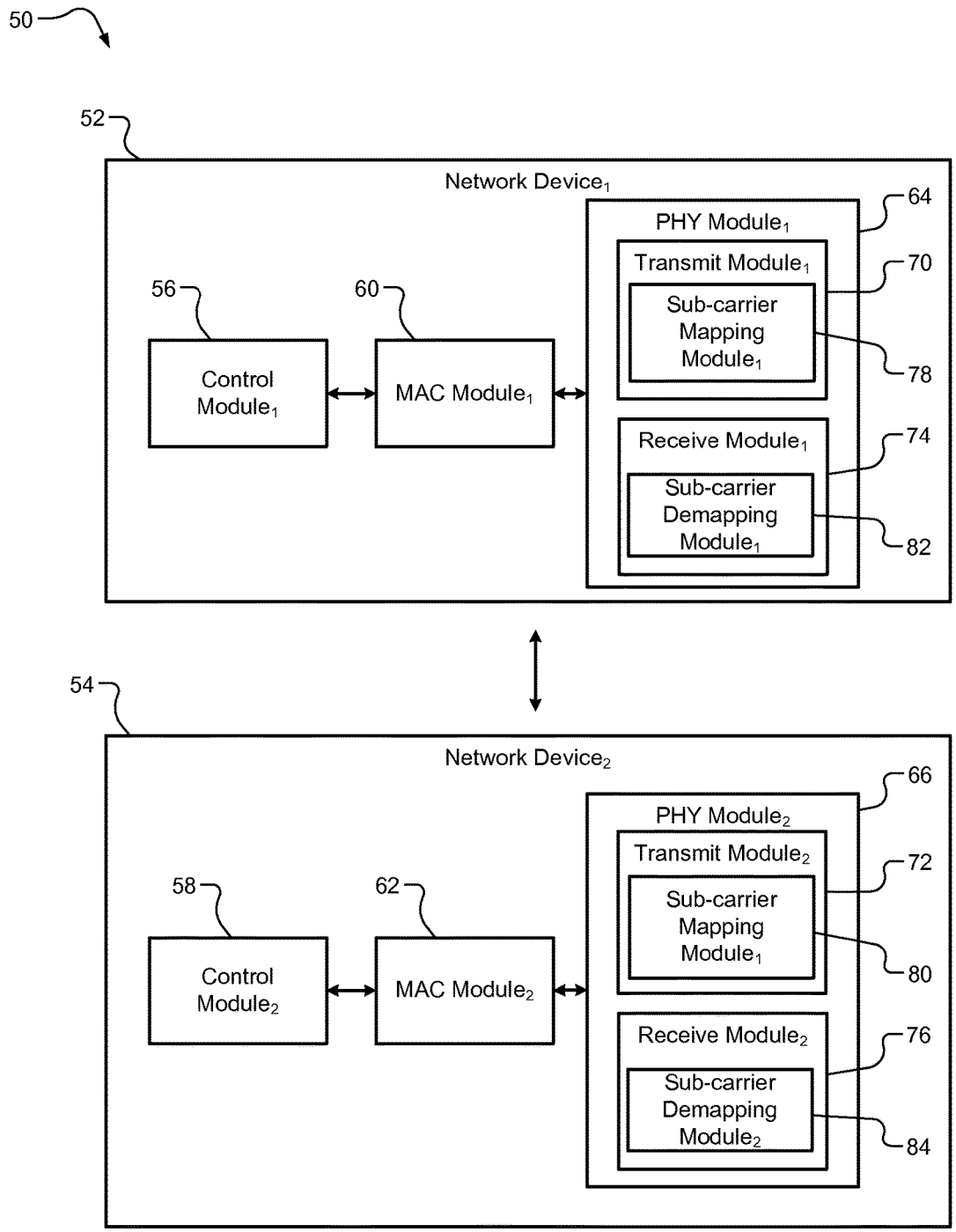
FIG. 2 is a functional block diagram of a wireless local area network including network devices with respective sub-carrier mapping modules in accordance with an embodiment of the present disclosure.

FIG. 2 shows a WLAN 50 that includes network devices 52, 54. The network devices 52, 54 include respective control modules 56, 58, medium access control (MAC) modules 60, 62, and physical layer (PHY) modules 64, 66. The control modules 56, 58 may transmit data to the MAC modules 60, 62 and/or receive data from the MAC modules 60, 62. The MAC modules 60, 62 may transmit data to the PHY modules 64, 66 and/or receive data from the PHY modules 64, 66. The PHY modules 64, 66 include transmit modules 70, 72 and receive modules 74, 76. The transmit modules 70, 72 include sub-carrier mapping modules 78, 80. The receiver modules 74, 76 include sub-carrier demapping modules 82, 84. The sub-carrier mapping modules 78, 80 map data in the form of bits to sub-carriers (or tones) based on the operating mode and predetermined parameters and/or requirements. The operating mode may be the single user mode or multi-user mode. The parameters may include DC offset, CFO, residual RX DC offset, and spectral mask values. The sub-carrier demapping modules 82, 84 demap tones to bits. The mapping and demapping is further described below with respect to FIGS. 3-9.

Figure 3:
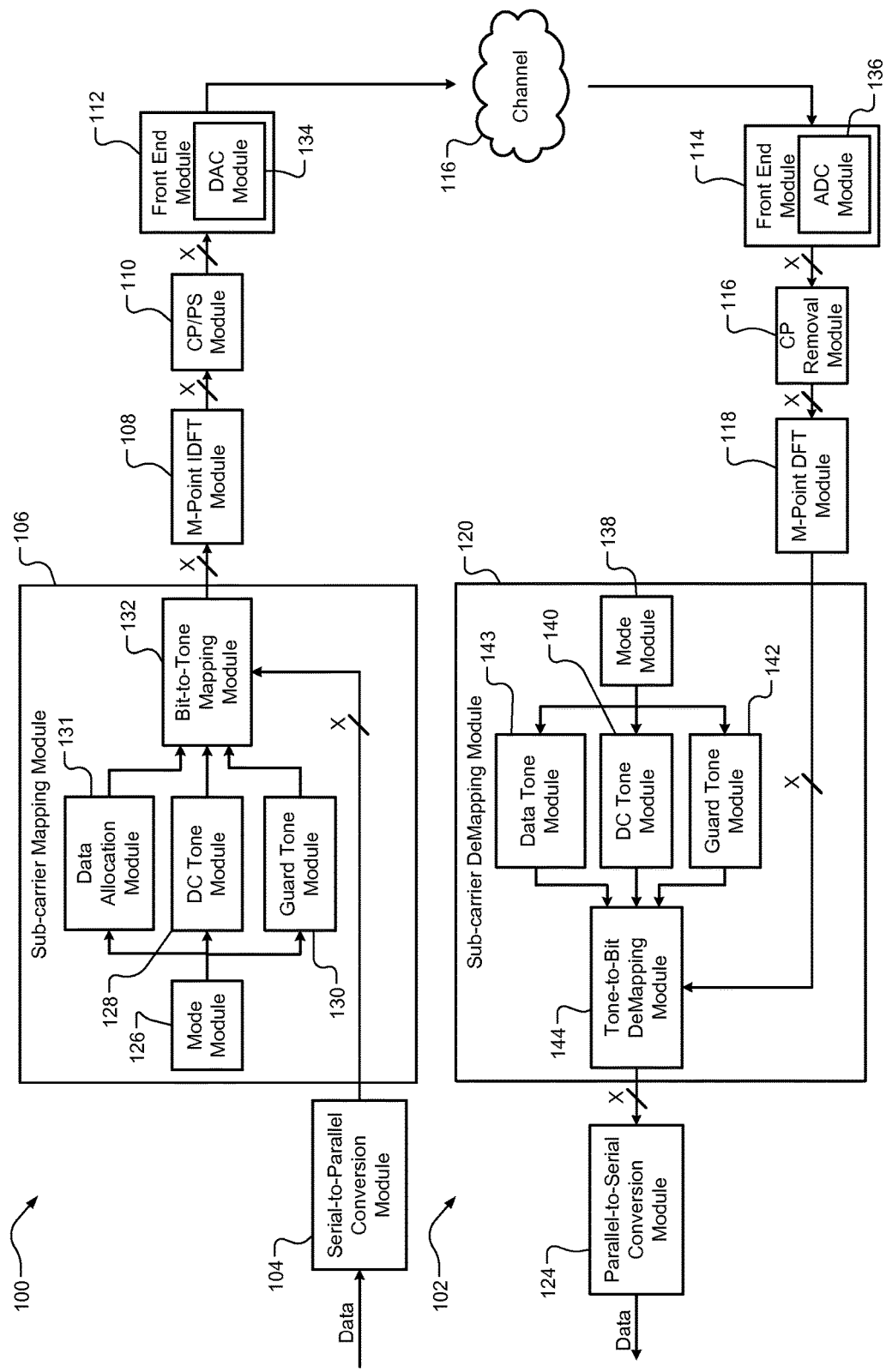
FIG. 3 is a functional block diagram illustrating portions of a transceiver module and a receiver module in accordance with an embodiment of the present disclosure.

FIG. 3 shows respective portions 100, 102 of a transceiver module (e.g., one of the transceiver modules 70, 72 of FIG. 2) and a receiver module (e.g., one of the receiver modules 74, 76 of FIG. 2). The portion 100 includes a serial-to-parallel conversion module 104, a sub-carrier mapping module 106, an inverse discrete Fourier transform (IDFT) module 108, a cyclical prefix (CP) and pulse shaping (PS) module 110 and a front end module 112. The serial-to-parallel conversion module 104 may include and/or be implemented as a serial-to-parallel converter. The portion 102 includes a front end module 114 that communicates with the front end module 112 via a channel 116. The portion 102 further includes a CP removal module 117, a discrete Fourier transform (DFT) module 118, a sub-carrier demapping module 120 and a parallel-to-serial conversion module 124. The parallel-to-serial conversion module 124 may include and/or be implemented as a parallel-to-serial converter. The sub-carrier mapping module 106 may include a mode module 126, a DC tone module 128, a guard tone module 130, a data tone allocation module 131, and a bit-to-tone mapping module 132. The front end modules 112, 114 include respectively a digital-to-analog converter (DAC) module 134 and an analog-to-digital converter (ADC) module 136. The converter modules 134, 136 may include and/or be implemented respectively as an analog-to-digital converter and a digital-to-analog converter. The sub-carrier demapping module 120 may include a mode module 138, a DC tone module 140, a guard tone module 142, a data tone module 143, and/or a tone-to-bit demapping module 144. The modules of FIG. 3 are further described below with respect to the method of FIG. 4.

Figure 4:
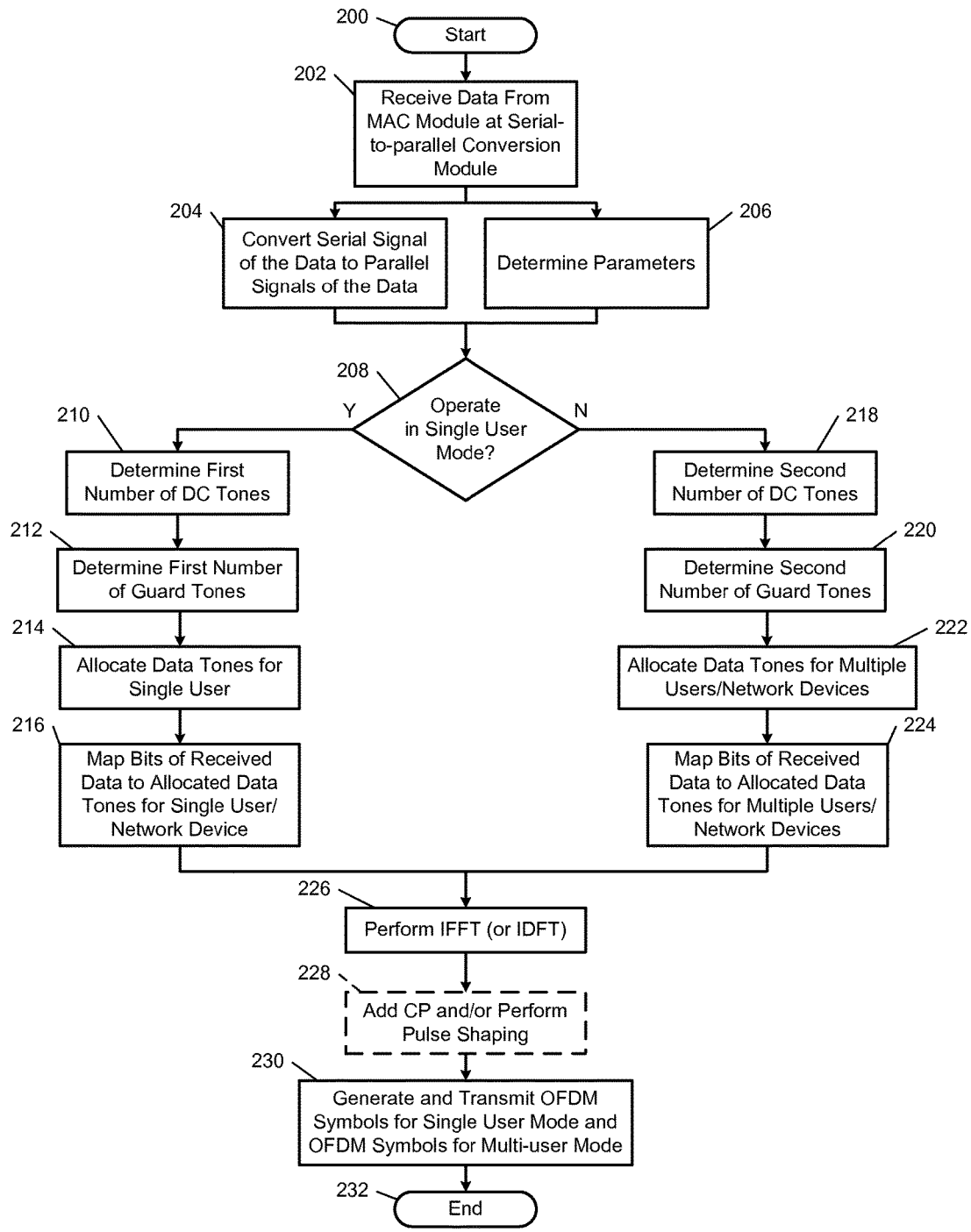
FIG. 4 illustrates a network device transmission method including bit-to-tone mapping in accordance with an embodiment of the present disclosure.
Figure 9:
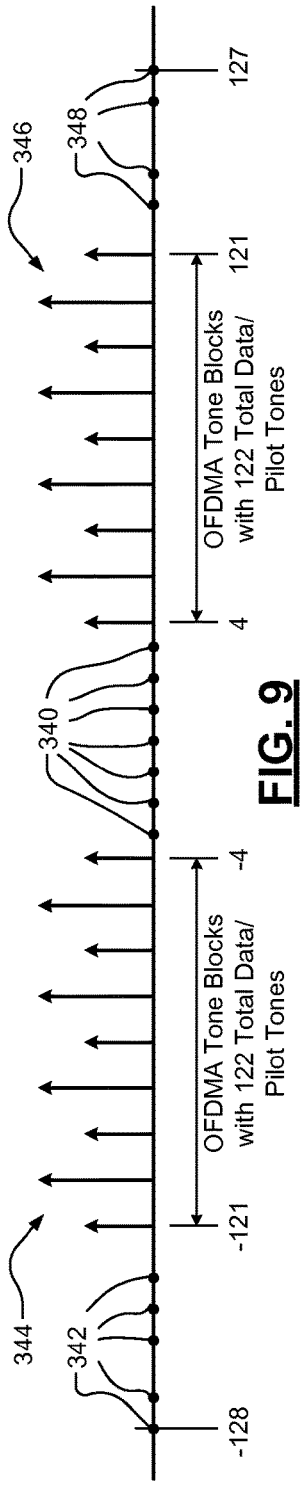
FIG. 9 is a tone diagram illustrating DC tones, data tones and guard tones for another multi-user operating mode in accordance with an embodiment of the present disclosure.
Figure 10:
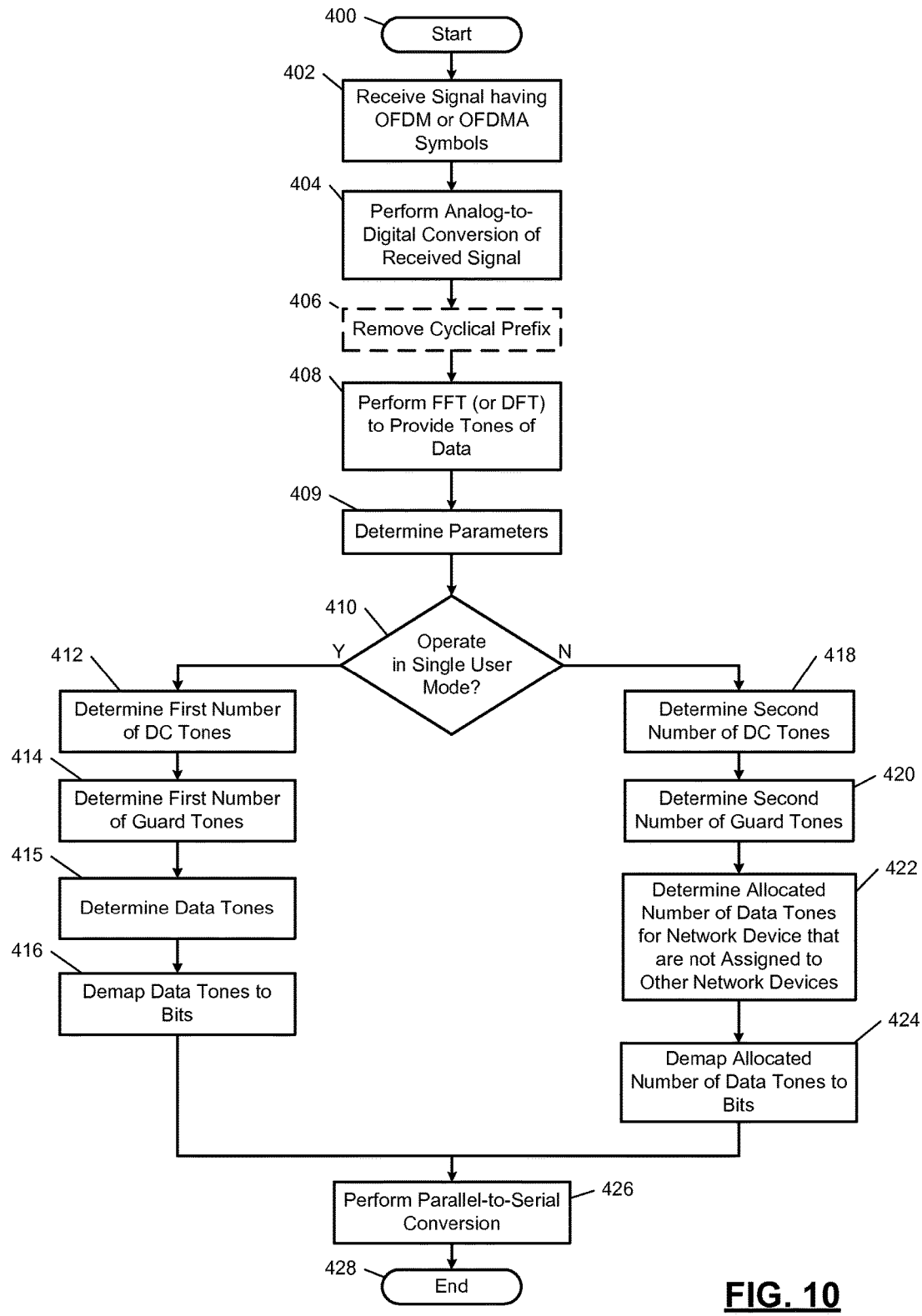
FIG. 10 illustrates a network device reception method including tone-to-bit demapping in accordance with the present disclosure.

The network devices disclosed herein may be operated using numerous methods, an example methods are illustrated in FIGS. 4 and 10. FIG. 4 shows a network device transmission method. Although the following tasks are primarily described with respect to the implementations of FIGS. 2-3 and 5-9, the tasks may be easily modified to apply to other implementations of the present disclosure. The tasks may be iteratively performed.

The method may begin at 200. At 202, data is received from a MAC module (e.g., the MAC module 60) of a first network device. Bits of data may be received in a serial format.

At 204, the serial-to-parallel conversion module 104 may convert the data from being in the serial format to being in a parallel format. This is shown by the X parallel lines between the serial-to-parallel conversion module, where X is an integer greater than or equal to two. At 206, a sub-carrier mapping module (e.g., the sub-carrier mapping module 106) determines parameters for which subsequent tasks, such as tasks 210, 212, 214, 224, 226 and/or 228, may be based. The parameters may be associated with the first network device and one or more other network devices. The parameters may be predetermined parameters stored in memory of the sub-carrier mapping module and/or corresponding network device. The parameters may include DC offsets, CFOs, residual RX DC offsets, spectral mask requirements (e.g., tones for which data may be transmitted and corresponding power values), number of users, frequency bands, FFT sizes, and/or power distribution values. The power distribution values may indicate power requirements (e.g., minimum and/or maximum power values) for data tones. Task 206 may be performed while task 204 is performed.

At 208, a mode module (e.g., the mode module 126) may determine a mode of operation, such as a single user mode or a multi-user mode. If the mode of operation is the single user mode, task 210 is performed. If the mode of operation is the multi-user mode, task 218 is performed. Different tone plans are provided for the different operating modes. In one embodiment, a tone plan refers to a number of DC tones, a number of positive and negative guard tones, and a number of data tones. A tone plan may also include a power distribution for the data tones. A tone plane may also include indications as to data tone and/or tone block allocations to network devices.

At 210, a DC tone module (e.g., the DC tone module 128) determines a first number of DC tones for the single user mode and based on one or more of the parameters determined at 206. For example, the larger the CFO the more DC tones. The CFO may be estimated based on a local oscillator frequency of a transmitter module of the first network device and a local oscillator frequency of a transmitter module of a second network device. The local oscillator frequency of the second network device may be determined based on information included in a signal received from a second network device at the first network device. The number of DC tones may be minimized to maximize the number of data tones and thus the percentage of data tones relative to other tones. The minimizing the number of DC tones may be based on the residual RX DC offset. The number of DC tones may be selected such that a frequency range between a center DC tone and a first adjacent data tone is greater than the residual RX DC offset. The number of DC tones may be based on the selected tone spacing TS such that the selected tone spacing TS multiplied by a result of the total number of DC tones ToneDC minus one and divided by two is greater than the residual RX DC offset (or TS*(ToneDC−1)/2>residual RX DC offset).

At 212, a guard tone module (e.g., the guard tone module 130) determines a first number of guard tones for the single user mode and based on one or more of the parameters determined at 206. The number of guard tones may be selected to meet or exceed a transmit spectrum mask requirements. The transmit spectrum mask requirements may indicate a required number of guard tones and/or a number of tones and/or corresponding frequencies over which data may be transmitted. The number of guard tones may be selected based on the predetermined and/or estimated DC offset and/or the CFO residual RX DC offset. The more adjacent channel (or band) interference the more guard tones used. The number of guard tones may be minimized to improve the percentage of data tones relative to other tones while meeting the spectrum mask requirements.

At 214, a data tone allocation module (e.g., the data tone allocation module 131) allocates and/or determines a number of data tones for a single user and/or a second network device. The single user may refer to a user of the second network device. The data tone allocation module may allocate all available and/or remaining tones as data tones for the second network device. The remaining tones refer to tones within a bandwidth designated for communication between the first network device and the second network device and not used as DC tones or guard tones. The data tones may be determined based on: one or more of the parameters determined at 206; the number and/or frequencies of the DC tones; and/or the number and/or frequencies of guard tones.

At 216, a bit-to-tone mapping module (e.g., the bit-to-tone mapping module 132) maps the bits of data to the allocated data tones and not to the DC tones and guard tones. Thus, the mapping may be based on: the number and/or frequencies of the DC tones; the number and/or frequencies of the guard tones; and/or the number and/or frequencies of the data tones. This may include grouping and/or mapping the bits of data to source data symbols (e.g., binary phase shift keying (BPSK) symbols or quadrature amplitude modulation (QAM) symbols). The mapping may include mapping bits of data and/or the source data symbols onto N orthogonal subcarriers, where N is an integer greater than or equal to two. The mapping may include mapping a constellation of points corresponding to the bits of data to OFDM points.

FIG. 5 shows an example tone diagram illustrating DC tones 300, negative (or low frequency side) guard tones 302, negative (or low frequency side) data tones 304, positive (or high frequency side) data tones 306 and positive (or high frequency side) guard tones 308 for a single user operating mode. For this example shown, the designated bandwidth may be 80 mega-hertz (MHz). The corresponding FFT size may be 1024. The tone spacing may be 80 MHz/1024 or 78.125 kilo-hertz (kHz). The number of the DC tones 300 may be 3 as shown or may be more than 3 (e.g., 5, as shown in FIG. 6). The number of the negative guard tones 302 may be 12 or less. The number of the positive guard tones 308 may be 11 or less. FIG. 6 shows an example tone diagram illustrating DC tones 310, negative guard tones 312, negative data tones 314, positive data tones 316, and positive guard tones 318 for another single user operating mode.

Figure 7:
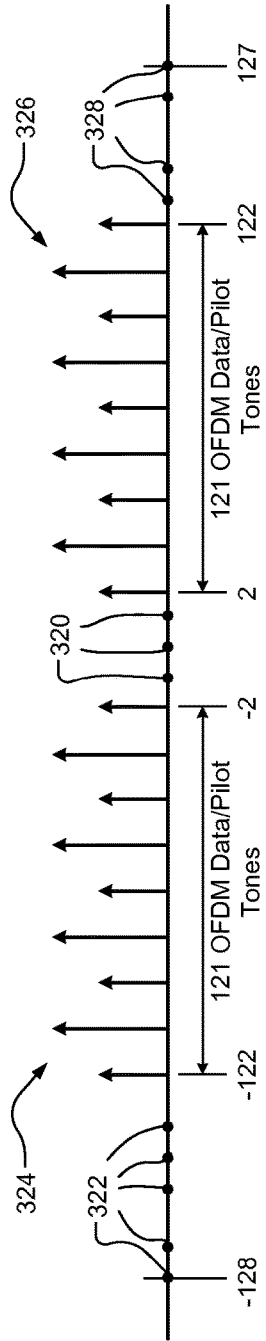
FIG. 7 is a tone diagram illustrating DC tones, data tones and guard tones for a multi-user operating mode in accordance with an embodiment of the present disclosure.

FIG. 7 shows yet another example tone diagram illustrating DC tones 320, negative (or low frequency side) guard tones 322, negative (or low frequency side) data tones 324, positive (or high frequency side) data tones 326 and positive (or high frequency side) guard tones 328 for another single user operating mode. For this example shown, the designated bandwidth may be 20 MHz. The corresponding FFT size may be 256. The tone spacing may be 20 MHz/256 or 78.125 kHz. The number of the DC tones 320 may be 3 as shown. The number of the negative guard tones 322 may be 6 or more. The number of the positive guard tones 328 may be 5 or more.

Referring again to FIG. 4, at 218, the DC tone module determines a second number of DC tones for the multi-user mode based on one or more of the parameters determined at 206. The second number of DC tones may be the same as or greater than the first number of DC tones. At 220, a guard tone module determines a second number of guard tones for the multi-user mode based on the one or more of the parameters determined at 206. The second number of guard tones may be the same or greater than the first number of guard tones.

At 222, a data tone allocation module allocates and/or determines a number of data tones for each of multiple users and/or multiple network devices. The multiple users may refer to network devices other than the first network device. The data tone allocation module may allocate certain tones and/or a certain block of data tones for each of the multiple network devices. The designated bandwidth may be shared by the multiple network devices such that each of the multiple network devices is allocated a portion of the data tones allocated to the second network device during the single user mode.

The tone block allocation may be regular or irregular such that tone block sizes may be regular or irregular. The tone block sizes may be regular if the total number of data tones is evenly divisible by the number of tone blocks. If the tone block sizes are regular then the tone blocks may be evenly distributed sub-bands for respective network devices. The tone block sizes may be irregular if the tone blocks have different numbers of tones. As such, certain network devices may be allocated more data tones than other network devices. When the tone block sizes are irregular, it may not be possible to have a tone packing efficiency of 1 where all of the data tones are allocated to corresponding tone blocks.

Due to the irregular tone block sizing that may be allocated during the multi-user mode, a certain number of tones may be left-over (i.e. not designated as DC tones, guard tones or data tones). As a result, left-over (or unused) tones may exist. The data tone allocation module may increase the number of DC tones and/or the number of guard tones by the number of left-over tones and adjust the data tones included in each of the tone blocks such that all of the tones in the designated bandwidth are used as DC tones, guard tones or data tones. This may include adjusting frequencies of the data tones allocated to one or more network devices. In one implementation, there are no left-over tones.

The number of DC tones and the number of guard tones may be adjusted based on the predetermined and/or estimated DC offset and/or the CFO residual RX DC offset. If CFO is large, then the number of DC tones is increased. If adjacent channel (or band) interference is large, then the number of guard tones is increased.

At 224, a bit-to-tone mapping module (e.g., the bit-to-tone mapping module 132) maps the bits of data to the allocated data tones and not to the DC tones and guard tones. Thus, the mapping may be based on: the number and/or frequencies of the DC tones; the number and/or frequencies of the guard tones; and/or the number and/or frequencies of the data tones. This may include grouping and/or mapping the bits of data to source data symbols (e.g., binary phase shift keying (BPSK) symbols or quadrature amplitude modulation (QAM) symbols). The mapping may include mapping bits of data and/or the source data symbols onto N orthogonal subcarriers, where N is an integer greater than or equal to two. The mapping may include mapping a constellation of points corresponding to the bits of data to OFDMA points. Power levels of the data tones may decrease the closer the data tones are to the guard tones.

Figure 8:
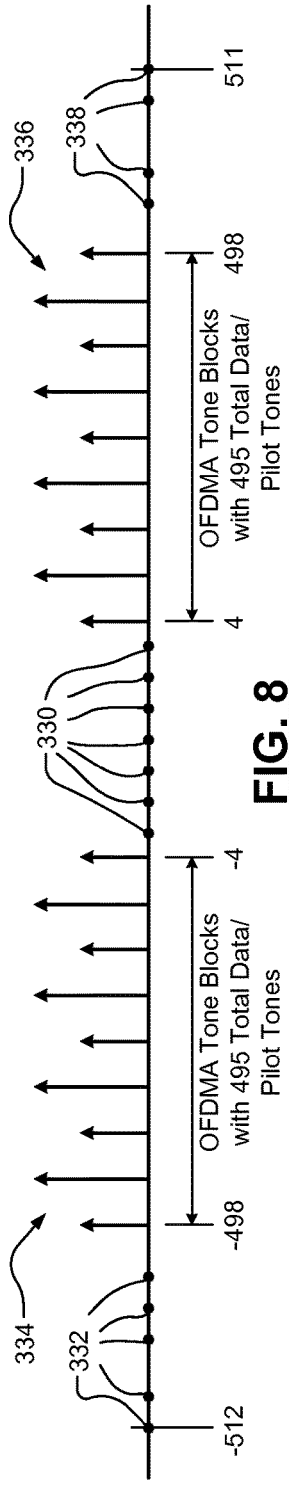
FIG. 8 is a tone diagram illustrating DC tones, data tones and guard tones for another single user operating mode in accordance with an embodiment of the present disclosure.

FIG. 8 shows an example tone diagram illustrating DC tones 330, negative guard tones 332, negative data tones 334, positive data tones 336, and positive guard tones 338 for a multi-user operating mode. For this example shown, the designated bandwidth may be 80 MHz. The corresponding FFT size may be 256. The tone spacing may be 80 MHz/1024 or 78.125 kHz. The number of the DC tones 330 may be 7 as shown. The number of the negative guard tones 332 may be 14 or less. The number of the positive guard tones 338 may be 13 or less.

FIG. 9 shows a tone diagram illustrating DC tones 340, negative guard tones 342, negative data tones 344, positive data tones 346 and positive guard tones 348 for another multi-user operating mode. For this example shown, the designated bandwidth may be 20 MHz. The corresponding FFT size may be 256. The tone spacing may be 20 MHz/256 or 78.125 kHz. The number of the DC tones 340 may be 7 as shown. The number of the negative guard tones 342 may be 7 or more. The number of the positive guard tones 348 may be 6 or more.

At 226, an IDFT module (e.g., the IDFT module) performs an IDFT (or IFFT) on the outputs of the bit-to-tone mapping module. This may include performing an IDFT on the source data symbols. The IDFT module performs a frequency to time domain conversion.

At 228, a cyclical prefix and/or pulse shaping module (e.g., the cyclical prefix and pulse shaping module 110) may add a cyclical prefix to an output of the IDFT module. Pulse shaping of the output of the IDFT module may also or alternatively be performed.

At 230, a front end module (e.g., the front end module 112) may perform a digital-to-analog conversion of an output of the IDFT module or the cyclical prefix and pulse shaping module. The front end module may generate and transmit OFDM symbols to the second network device via a channel (e.g., the channel 116) while operating in the single user mode. The front end module may generate and transmit OFDMA symbols to the multiple network devices via the channel while operating in the multi-user mode. The method may end at 232.

FIG. 10 shows a network device reception method. Although the following tasks are primarily described with respect to the implementations of FIGS. 2-9, the tasks may be easily modified to apply to other implementations of the present disclosure. The tasks may be iteratively performed.

The method may begin at 400. At 402, a front end module (e.g., the front end module 114) of a network device (e.g., the second network device described above with respect to the method of FIG. 4 for the single user mode or one of the multiple network devices described above with respect to the method of FIG. 4 for the multi-user mode) receives via a channel (e.g., the channel 116) OFDM signals or OFDMA signals. The OFDM signals may be received while operating in the single user mode. The OFDMA signals may be received while operating in the multi-user mode. At 404, an analog-to-digital converter (e.g., the ADC module 136) converts the OFDM signals or the OFDMA signals from analog signals to digital signals.

At 406, a cyclical prefix removal module (e.g., the cyclical prefix removal module 117) may remove cyclical prefixes from the OFDM signals or OFDMA signals.

At 408, a DFT module (e.g., the DFT module 118) performs a DFT (or FFT) to extract tones of data for the user of the network device. The DFT module performs DFT (or a FFT) to perform a time domain to frequency domain conversion.

At 409, a sub-carrier demapping module (e.g., the sub-carrier demapping module 120) determines parameters, such as the parameters determined above at 206 in FIG. 4. The parameters may be predetermined and stored in memory of the sub-carrier demapping module and/or corresponding network device.

At 410, a mode module (e.g., the mode module 138) determines whether to operate in the single user mode or the multi-user mode. This may be based on the received data and/or one or more of the parameters. Task 412 is performed when operating in the single user mode. Task 418 is performed when operating in the multi-user mode.

At 412, a DC tone module (e.g., the DC tone module 140) determines a first number of DC tones for the single user mode and based on one or more of the parameters determined at 409. At 414, a guard tone module (e.g., the guard tone module 142) determines a first number of guard tones for the single-user mode and based on one or more of the parameters determined at 409.

At 415, a data tone module (e.g., the data tone module 143) determines data tones used for the single user mode based on: the number and/or frequencies of the DC tones; the number and/or frequencies of the guard tones; and/or one or more of the parameters determined at 409.

At 416, a tone-to-bit demapping module (e.g., the tone-to-bit demapping module 144) demaps data tones of data output from the DFT module 118 to bits while ignoring the DC tones and the guard tones. This may be based on: the number and/or frequencies of the DC tones; the number and/or frequencies of the guard tones; and/or the number and/or frequencies of the data tones.

At 418, the DC tone module determines a second number of DC tones for the multi-user mode and based on one or more of the parameters determined at 409. At 420, the guard tone module determines a second number of guard tones for the multi-user mode and based on one or more of the parameters determined at 409.

At 422, the data tone module determines data tones used for the multi-user mode based on: the number and/or frequencies of the DC tones; the number and/or frequencies of the guard tones; and/or one or more of the parameters determined at 409.

At 424, the tone-to-bit demapping module demaps data tones of data output from the DFT module 118 to bits while ignoring the DC tones and the guard tones. This may be based on the number and/or frequencies of the DC tones, the number and/or frequencies of the guard tones and/or the number and frequencies of the data tones.

At 426, a parallel-to-serial conversion module (e.g., the parallel-to-serial conversion module 124) converts bits provided in a parallel format and out of the sub-carrier demapping module to a serial format. The method may end at 428.

The above-described tasks of FIG. 4 and FIG. 10 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described examples provide tone plans for improved performance of systems operating according to IEEE 802.11/Wi-Fi® standards and in single user and multi-user modes. The examples account for and utilize or assign left-over tones during the multi-user mode to DC tones and/or guard tones. This increases the number of DC tones and/or guard tones for improved system performance. The multi-user mode may as a result have more DC tones and/or guard tones than the single user mode. The tone plans may be applied to network devices operating according to the IEEE 802.11ax standard and/or operating in, for example, 20 MHz and 80 MHz frequency bands. While operating in these frequency bands and/or other frequency bands the number of DC tones and/or guard tones may be selected to be the same or more for the multi-user mode than for the single user mode.

The wireless communications described in the present disclosure can be conducted in full or partial compliance with IEEE standard 802.11-2012, IEEE standard 802.16-2009, and/or IEEE standard 802.20-2008. In various implementations, IEEE 802.11-2012 may be supplemented by draft IEEE standard 802.11ax, IEEE standard 802.11b, IEEE standard 802.11g, IEEE standard 802.11n, IEEE standard 802.11ac, draft IEEE standard 802.11ad, and/or draft IEEE standard 802.11ah.

Further aspects of the present invention relates to one or more of the following clauses. A system is provided herein and includes a direct current tone module, a guard tone module, a data tone allocation module, a mapping module, an inverse Fourier transform module, and a transmitter. The direct current tone module is configured to determine a number of direct current tones based on whether a first network device is operating in a single user mode or a multi-user mode. The guard tone module is configured to determine a number of guard tones based on whether the first network device is operating in the single user mode or the multi-user mode. The data tone allocation module is configured to determine a number of data tones based on (i) the number of direct current tones and (ii) the number of guard tones. The mapping module is configured to (i) receive data, and (ii) based on the number of data tones, map the data to the data tones. The inverse Fourier transform module is configured to perform a frequency domain to time domain conversion of an output of the mapping module to generate (i) orthogonal frequency division multiplexing symbols responsive to the first network device operating in the single user mode, and (ii) orthogonal frequency division multiplexing access symbols responsive to the first network device operating in the multi-user mode. The transmitter is configured to transmit via a channel of a wireless local area network and from the first network device (i) the orthogonal frequency division multiplexing symbols responsive to the first network device operating in the single user mode, and (ii) the orthogonal frequency division multiplexing access symbols responsive to the first network device operating in the multi-user mode.

In other aspects, the direct current tone module is configured to (i) select a first number of direct current tones for the single user mode, and (ii) select a second number of direct current tones for the multi-user mode. The second number is greater than or equal to the first number. In other aspects, the second number is greater than the first number.

In other aspects, the guard tone module is configured to (i) select a first number of guard tones for the single user mode, and (ii) select a second number of guard tones for the multi-user mode. The second number is greater than or equal to the first number. In other aspects, the second number is greater than the first number.

In other aspects, the direct current tone module is configured to determine the number of direct current tones based on a direct current offset, a carrier frequency offset, or a residual receiver direct current offset.

In other aspects, the guard tone module is configured to determine the number of guard tones based on a direct current offset, a carrier frequency offset, or a residual receiver direct current offset.

In other aspects, the guard tone module is configured to determine the number of guard tones based on a spectrum mask requirement for transmission of the orthogonal frequency division multiplexing symbols or the orthogonal frequency division multiplexing access symbols.

In other aspects, the data tone allocation module is configured to allocate the data tones to network devices in an irregular format such that one or more data tones are left-over and not allocated to any of the network devices. The network devices do not include the first network device. The mapping module is configured increase the number of direct current tones or the number of guard tones by a number of the data tones left-over.

In other aspects, the data tone allocation module is configured to, based on the increased number of direct current tones or the increased number of guard tones, adjust frequencies of the data tones, which are allocated to the network devices.

In other aspects, a method is provided. The method includes: determining a number of direct current tones based on whether a first network device is operating in a single user mode or a multi-user mode; determining a number of guard tones based on whether the first network device is operating in the single user mode or the multi-user mode; determining a number of data tones based on the number of direct current tones and the number of guard tones; receiving data at a mapping module; based on the number of data tones, mapping the data to the data tones; performing a frequency domain to time domain conversion of an output of the mapping module to generate (i) orthogonal frequency division multiplexing symbols responsive to the first network device operating in the single user mode, and (ii) orthogonal frequency division multiplexing access symbols responsive to the first network device operating in the multi-user mode; and transmitting via a channel of a wireless local area network and from the first network device (i) the orthogonal frequency division multiplexing symbols responsive to the first network device operating in the single user mode, and (ii) the orthogonal frequency division multiplexing access symbols responsive to the first network device operating in the multi-user mode.

In other aspects, the method further includes: selecting a first number of direct current tones for the single user mode; selecting a second number of direct current tones for the multi-user mode; and the second number is greater than or equal to the first number. In other aspects, the second number is greater than the first number.

In other aspects, the method further includes: selecting a first number of guard tones for the single user mode; selecting a second number of guard tones for the multi-user mode; and the second number is greater than or equal to the first number. In other aspects, the second number is greater than the first number.

In other aspects, the method further includes determining the number of direct current tones based on a direct current offset, a carrier frequency offset, or a residual receiver direct current offset. In other aspects, the method further includes determining the number of guard tones based on a direct current offset, a carrier frequency offset, or a residual receiver direct current offset. In other aspects, the method further includes determining the number of guard tones based on a spectrum mask requirement for transmission of the orthogonal frequency division multiplexing symbols or the orthogonal frequency division multiplexing access symbols.

In other aspects, the method further includes: allocating the data tones to network devices in an irregular format such that one or more data tones are left-over and not allocated to any of the network devices, where the network devices do not include the first network device; and increasing the number of direct current tones or the number of guard tones by a number of the data tones left-over.

In other aspects, the method further includes, based on the increased number of direct current tones or the increased number of guard tones, adjusting frequencies of one or more of the data tones, which are allocated to the network devices.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain aspects, any one or more of those aspects described with respect to any embodiment of the disclosure can be implemented in and/or combined with aspects of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a direct current tone module configured to determine for a first network device (i) a first number of direct current tones when the first network device is operating in a single user mode, and (ii) a second number of direct current tones when the first network device is operating in a multi-user mode;
a guard tone module configured to determine for the first network device (i) a first number of guard tones when the first network device is operating in the single user mode, and (ii) a second number of guard tones when the first network device is operating in the multi-user mode,
wherein the direct current tone module is configured to determine the first number of direct current tones or the second number of direct current tones based on a direct current offset or a residual receiver direct current offset, and wherein the guard tone module is configured to determine the first number of guard tones or the second number of guard tones based on the direct current offset or the residual receiver direct current offset;
a data tone allocation module configured to determine a number of data tones based on (i) the first number of direct current tones and the first number of guard tones when operating in the single user mode, and (ii) the second number of direct current tones and the second number of guard tones when operating in the multi-user mode;
a mapping module configured to (i) receive data, and (ii) based on the number of data tones, map the data to the data tones;
an inverse Fourier transform module configured to perform a frequency domain to time domain conversion of an output of the mapping module to generate (i) orthogonal frequency division multiplexing symbols responsive to the first network device operating in the single user mode, and (ii) orthogonal frequency division multiplexing access symbols responsive to the first network device operating in the multi-user mode; and
a transmitter configured to transmit via a channel of a wireless local area network and from the first network device (i) the orthogonal frequency division multiplexing symbols responsive to the first network device operating in the single user mode, and (ii) the orthogonal frequency division multiplexing access symbols responsive to the first network device operating in the multi-user mode.

2. The system of claim 1, wherein the second number of direct current tones is greater than or equal to the first number of direct current tones.

3. The system of claim 2, wherein the second number of direct current tones is greater than the first number of direct current tones.

4. The system of claim 1, wherein the second number of guard tones is greater than or equal to the first number of guard tones.

5. The system of claim 4, wherein the second number of guard tones is greater than the first number of guard tones.

6. The system of claim 1, wherein the guard tone module is configured to determine the first number of guard tones or the second number of guard tones based on a carrier frequency offset.

7. The system of claim 1, wherein:
the guard tone module is configured to determine the first number of guard tones and the second number of guard tones based on spectrum mask requirements for transmission respectively of the orthogonal frequency division multiplexing symbols and the orthogonal frequency division multiplexing access symbols; and
the spectrum mask requirements for transmission of the orthogonal frequency division multiplexing symbols and the orthogonal frequency division multiplexing access symbols refer to (i) tones for which the data is transmitted and (ii) corresponding power values.

8. The system of claim 1, wherein:
the data tone allocation module is configured to allocate the data tones to a plurality of network devices in an irregular format such that one or more data tones are left-over and not allocated to any of the plurality of network devices;
the plurality of network devices do not include the first network device; and
the mapping module is configured increase, by a number of the data tones left-over, the second number of direct current tones or the second number of guard tones.

9. The system of claim 8, wherein the data tone allocation module is configured to, based on the increased second number of direct current tones, or increased second number of guard tones, adjust frequencies of the data tones, which are allocated to the plurality of network devices.

10. The system of claim 1, wherein the guard tone module is configured to determine the first number of guard tones or the second number of guard tones based on the direct current offset or the residual receiver direct current offset.

11. The system of claim 1, wherein the guard tone module is configured to determine a different number of positive guard tones than a number of negative guard tones.

12. A network device comprising:
the system of claim 1; and
a mode module configured to determine whether to operate in the single user mode or the multi-user mode,
wherein the transmitter is configured to transmit via the channel and to a second network device (i) the orthogonal frequency division multiplexing symbols responsive to the operating in the single user mode, and (ii) the orthogonal frequency division multiplexing access symbols responsive to operating in the multi-user mode.

13. The system of claim 1, wherein the guard tone module is configured to determine the first number of guard tones or the second number of guard tones based on the direct current offset and the carrier frequency offset.

14. A method comprising:
determining for a first network device (i) a first number of direct current tones when the first network device is operating in a single user mode, and (ii) a second number of direct current tones when the first network device is operating in a multi-user mode;
determining for the first network device (i) a first number of guard tones when the first network device is operating in the single user mode, and (ii) a second number of guard tones when the first network device is operating in the multi-user mode,
wherein the first number of direct current tones or the second number of direct current tones are determined based on a direct current offset or a residual receiver direct current offset, and wherein the first number of guard tones or the second number of guard tones are determined based on the direct current offset or the residual receiver direct current offset;
determining a number of data tones based on (i) the first number of direct current tones and the first number of guard tones when operating in the single user mode, and (ii) the second number of direct current tones and the second number of guard tones when operating in the multi-user mode;
receiving data at a mapping module;
based on the number of data tones, mapping the data to the data tones;
performing a frequency domain to time domain conversion of an output of the mapping module to generate (i) orthogonal frequency division multiplexing symbols responsive to the first network device operating in the single user mode, and (ii) orthogonal frequency division multiplexing access symbols responsive to the first network device operating in the multi-user mode; and
transmitting via a channel of a wireless local area network and from the first network device (i) the orthogonal frequency division multiplexing symbols responsive to the first network device operating in the single user mode, and (ii) the orthogonal frequency division multiplexing access symbols responsive to the first network device operating in the multi-user mode.

15. The method of claim 14, wherein the second number of direct current tones is greater than or equal to the first number of direct current tones.

16. The method of claim 15, wherein the second number of direct current tones is greater than the first number of direct current tones.

17. The method of claim 14, wherein the second number of guard tones is greater than or equal to the first number of guard tones.

18. The method of claim 17, wherein the second number of guard tones is greater than the first number of guard tones.

19. The method of claim 14, further comprising determining the first number of guard tones or the second number of guard tones based on a carrier frequency offset.

20. The method of claim 14, further comprising determining the first number of guard tones and the second number of guard tones based on spectrum mask requirements for transmission respectively of the orthogonal frequency division multiplexing symbols and the orthogonal frequency division multiplexing access symbols, wherein the spectrum mask requirements for transmission of the orthogonal frequency division multiplexing symbols and the orthogonal frequency division multiplexing access symbols refer to (i) tones for which the data is transmitted and (ii) corresponding power values.

21. The method of claim 14, further comprising:
allocating the data tones to a plurality of network devices in an irregular format such that one or more data tones are left-over and not allocated to any of the plurality of network devices, wherein the plurality of network devices do not include the first network device; and
by a number of the data tones left-over, increasing the second number of direct current tones or the second number of guard tones.

22. The method of claim 21, further comprising, based on the increased second number of direct current tones or increased second number of guard tones, adjusting frequencies of one or more of the data tones, which are allocated to the plurality of network devices.

23. A system comprising:
a direct current tone module configured to determine for a first network device (i) a first number of direct current tones when the first network device is operating in a single user mode, and (ii) a second number of direct current tones when the first network device is operating in a multi-user mode, wherein the direct current tone module is configured to select the first number of direct current tones such that a frequency range between a center direct current tone and an adjacent data tone is greater than a residual direct current offset;
a guard tone module configured to determine for the first network device (i) a first number of guard tones when the first network device is operating in the single user mode, and (ii) a second number of guard tones when the first network device is operating in the multi-user mode;
a data tone allocation module configured to determine a number of data tones based on (i) the first number of direct current tones and the first number of guard tones if operating in the single user mode, and (ii) the second number of direct current tones and the second number of guard tones if operating in the multi-user mode;
a mapping module configured to (i) receive data, and (ii) based on the number of data tones, map the data to the data tones;
an inverse Fourier transform module configured to perform a frequency domain to time domain conversion of an output of the mapping module to generate (i) orthogonal frequency division multiplexing symbols responsive to the first network device operating in the single user mode, and (ii) orthogonal frequency division multiplexing access symbols responsive to the first network device operating in the multi-user mode; and
a transmitter configured to transmit via a channel of a wireless local area network and from the first network device (i) the orthogonal frequency division multiplexing symbols responsive to the first network device operating in the single user mode, and (ii) the orthogonal frequency division multiplexing access symbols responsive to the first network device operating in the multi-user mode.

24. A system comprising:
a direct current tone module configured to determine for a first network device (i) a first number of direct current tones when the first network device is operating in a single user mode, and (ii) a second number of direct current tones when the first network device is operating in a multi-user mode, wherein the direct current tone module is configured to select the first number of direct current tones based on a tone spacing such that the tone spacing multiplied by a result of a total number of direct current tones minus one and divided by two is greater than a residual direct current offset, and wherein the total number of direct current tones is less than or equal to twice the selected first number of direct current tones;
a guard tone module configured to determine for the first network device (i) a first number of guard tones when the first network device is operating in the single user mode, and (ii) a second number of guard tones when the first network device is operating in the multi-user mode;
a data tone allocation module configured to determine a number of data tones based on (i) the first number of direct current tones and the first number of guard tones if operating in the single user mode, and (ii) the second number of direct current tones and the second number of guard tones if operating in the multi-user mode;
a mapping module configured to (i) receive data, and (ii) based on the number of data tones, map the data to the data tones;
an inverse Fourier transform module configured to perform a frequency domain to time domain conversion of an output of the mapping module to generate (i) orthogonal frequency division multiplexing symbols responsive to the first network device operating in the single user mode, and (ii) orthogonal frequency division multiplexing access symbols responsive to the first network device operating in the multi-user mode; and
a transmitter configured to transmit via a channel of a wireless local area network and from the first network device (i) the orthogonal frequency division multiplexing symbols responsive to the first network device operating in the single user mode, and (ii) the orthogonal frequency division multiplexing access symbols responsive to the first network device operating in the multi-user mode.

\* \* \* \* \*